US006235830B1

(12) United States Patent
Ohmori et al.

(10) Patent No.: US 6,235,830 B1
(45) Date of Patent: May 22, 2001

(54) POLYURETHANE RESIN TYPE COMPOSITION FOR SLUSH MOLDING

(75) Inventors: Hideki Ohmori, Kyoto (JP); Yoshitsugu Takai, Kyoto (JP), Eriko Takai, legal representative; Junzo Ukai, Nagoya (JP); Hideo Nishimura, Toyota (JP); Kazuo Kobayashi, Toyota (JP); Mahito Nomura, Toyota (JP)

(73) Assignees: Sanyo Chemical Industries, Ltd., Kyoto; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/405,840

(22) Filed: Sep. 27, 1999

(30) Foreign Application Priority Data

Sep. 28, 1998 (JP) .................................................. 10-272715

(51) Int. Cl.$^7$ ...................................................... C08L 75/04
(52) U.S. Cl. ......................... 524/500; 524/306; 524/311; 524/314; 524/378; 524/590; 525/424; 525/455
(58) Field of Search .................................... 525/454, 455; 524/500, 590, 306, 311, 314, 378

(56) References Cited

U.S. PATENT DOCUMENTS

| 3,489,723 | 1/1970 | Kraft . |
| 3,907,751 | 9/1975 | Knight et al. ........................... 260/47 |
| 4,985,490 | 1/1991 | Rosthauser et al. . |
| 5,077,339 | 12/1991 | Gröler et al. . |
| 5,096,993 | 3/1992 | Smith et al. . |
| 5,210,127 | 5/1993 | Werner et al. . |
| 5,906,704 | 5/1999 | Matsuura et al. . |

FOREIGN PATENT DOCUMENTS

| 2840388 | 3/1980 | (DE) . |
| 810 489 | 3/1959 | (GB) . |
| 45-1474 | 1/1970 | (JP) . |
| 53-29705 | 8/1978 | (JP) . |
| 59-39464 | 9/1984 | (JP) . |
| 60-30688 | 7/1985 | (JP) . |
| 4-255755 | 9/1992 | (JP) . |
| 5-43826 | 2/1993 | (JP) . |
| 5-279485 | 10/1993 | (JP) . |
| 7-133423 | 5/1995 | (JP) . |
| 8-120041 | 5/1996 | (JP) . |

OTHER PUBLICATIONS

R.F. Fedors, A Method for Estimating Both the Solubility Parameters and Molar Volumes of Liquids, Polymer Engineering and Science, vol. 14, No. 2, pp. 147–154, (1974).
Derwent Abstract—JP 4–255755 (1992) (Abstract Only).
Derwent Abstract—JP 8–120041 (1996) (Abstract Only).

*Primary Examiner*—Patricia A. Short
(74) *Attorney, Agent, or Firm*—Finnegan, Henderson, Farabow, Garrett & Dunner, L.L.P.

(57) ABSTRACT

A composition suitable for slush molding comprising a thermoplastic polyurethane elastomer (A) having a number average molecular weight of 10,000 to 50,000 and a heat softening initiation temperature of 120 to 200° C., a plasticizer (B), a compound (C) containing a radical polymerizable unsaturated group, and optionally an additive. The composition provides a molded article excellent in durability such as thermal/light aging resistance, soft touch at low temperature, and appearance.

24 Claims, No Drawings

POLYURETHANE RESIN TYPE COMPOSITION FOR SLUSH MOLDING

FIELD OF THE INVENTION

The present invention relates to a composition for slush molding, more particularly to a slush molding composition capable of producing molded articles suitable for automotive trims such as instrument panels.

BACKGROUND OF THE INVENTION

Slush molding process has been widely practiced for molding various articles as interior component parts of motor vehicles. In this molding, there have been proposed modifications of PVC with flexible thermoplastic polyurethane resin as materials to provide soft touch without a low molecular weight plasticizer, as disclosed in Examined Japanese Patent Publication Nos. S53-29705, S59-39464 and S60-30688.

SUMMARY OF THE INVENTION

It is an object of the present invention to provide a molded article of improved compatibility of plasticizer and soft feel even at low temperature. It is another object of the present invention to provide a molded article of little or reduced fogging problem (formation of oil film of evaporated plasticizer on the automotive front windshield) and suitable for automotive instrument panels. It is a further object of the present invention to provide a molded article having improved pigment dispersibility without causing uneven color even in light color. It is still another object of the present invention to provide a molded article having improved durability and resistance to ultraviolet, high temperature and chemicals. It is yet another object of the present invention to provide a slush molding composition and a process, capable of producing a molded article as above.

Briefly, these and other objects of this invention as hereinafter will become more readily apparent have been attained broadly by a slush molding composition, comprising a thermoplastic polyurethane elastomer (A), a plasticizer (B) and a radical polymerizable group-containing compound (C). The thermoplastic polyurethane elastomer (A) usually has a number average molecular weight (measured by GPC, hereinafter referred to as Mn) of about 10,000 to about 50,000, a glass transition temperature of not higher than −35° C., and a heat softening initiation temperature of about 120° C. to about 200° C.

DETAILED DESCRIPTION OF THE INVENTION

Suitable thermoplastic urethane elastomers (A) according to the present invention include, for example, those desclosed in U.S. Pat. No. 5,906,704. Illustrative of (A) are ones obtainable by reacting an NCO-terminated urethane prepolymer (a) with a non-aromatic diamine (b1) and an aliphatic monoamine (b2). Said prepolymer (a) is derived from an excess non-aromatic diisocyanate (a1) and a high-molecular diol (a2) having a number average molecular weight of 500 to 10,000 with, optionally, a low-molecular diol (a3).

Suitable non-aromatic diisocyanates (a1) include, for example, ① aliphatic diisocyanates with 2 to 18 carbon atoms (except the carbon atoms in the NCO groups, similarly hereinafter), e.g., ethylene diisocyanate, tetramethylene diisocyanate, hexamethylene diisocyanate (hereinafter referred to as HDI), dodecamethylene diisocyanate, 2,2,4-trimethylhexamethylene diisocyanate, lysine diisocyanate, 2,6-diisocyanatomethyl caproate, bis(2-isocyanatoethyl) fumarate, bis(2-isocyanato ethyl)carbonate, 2-isocyanatoethyl-2,6-diisocyanatohexanoate, and the like; ② alicyclic diisocyanates with 4 to 15 carbon atoms, e.g., isophorone diisocyanate (hereinafter referred to as IPDI), dicyclohexylmethane-4,4'-diisocyanate (hereinafter referred to as hydrogenated MDI), cyclohexylene diisocyanate, methyl cyclohexylene diisocyanate (hereinafter referred to as hydrogenated TDI), bis(2-isocyanato ethyl)-4-cyclohexene, and the like; ③ araliphatic isocyanate with 8 to 15 carbon atoms, e.g., m- and/or p-xylylene diisocyanate (hereinafter a referred to as XDI), α, α, α', α'-tetramethyl xylylene diisocyanate (hereinafter referred to as TMXDI), and the like; ④ modified diisocyanates from these, e.g., diisocyanates having a carbodiimide group, an urethodione group, an urethoimine group or an urea group; and ⑤ mixtures of two or more of those compounds.

Among these compounds, preferred are alicyclic diisocyanates, particularly IPDI and hydrogenated MDI.

Suitable high molecular weight diols (a2) include polyester diols, polyether diols and mixtures of two or more of those compounds.

As the aforesaid polyester diol can be cited: ① polycondensates of a low molecular weight diol and/or a polyether diol with a dicarboxylic acid or its ester-forming derivative (acid anhydride, lower alkyl ester containing one to 4 carbon atoms, acid halide, and the like); ② ring opening polymerizates of a lactone monomer with a low molecular weight diol and/or a polyehter diol as initiator; and mixtures of two or more of those compounds.

The aforesaid low molecular weight diol usually has a molecular weight of 62–about 500. Examples of such diol include: aliphatic diols [linear ones such as ethylene glycol, diethylene glycol, 1,3-propanediol, 1,4-butanediol, 1,5-pentanediol, 1,6-hexanediol, 1,8-octanediol, and the like, branched ones such as propylene glycol, neopentyl glycol, 3-methyl-1,5-pentanediol, 2,2-diethyl-1,3-propanedio 1,1,2-butanediol, 1,3-butanediol, and 2,3-butanediol]; and diols that contain cyclic group [ones described in exemplified Japanese Patent Publication No. S45-1474, alicyclic diols such as 1,4-bis(hydroxymethyl)cyclohexane and hydrogenated bisphenol A, aromatic ring-containing diols such as m-xylylene glycol, p-xylylene glycol, alkylene oxide adduct of bisphenol A, alkylene oxide adduct of bisphenol S, alkylene oxide adduct of bisphenol F, alkylene oxide adduct of dihydroxynaphthalene and bis(2-hydroxyethyl) terephthalate]. Suitable polyether diols include the same ones as described below. Mixtures of two or more of these diols may also be used.

Of these compounds preferable are aliphatic diols (particularly neopentyl glycol) and alicyclic diols (particularly hydrogenated bisphenol A).

Examples of the dicarboxylic acid or its ester-forming derivative in aforesaid ① include aliphatic dicarboxylic acids with 4 to 15 carbon atoms such as succinic, adipic, sebacic, glutaric, azelaic, maleic and fumaric acids; aromatic dicarboxylic acids with 8 to 12 carbon atoms such as terephthalic and isophthalic acids; their ester-forming derivatives such as acid anhydrides, lower alkyl esters (e.g., dimethyl ester, diethyl ester), acid halides (e.g., acid chloride); and mixtures of two or more of these compounds. Among these, preferred are adipic acid and isophthalic acid.

Examples of the lactone monomer in aforesaid ② include γ-butyrolactone, ε-caprolactone, γ-valerolactone and mixtures of two or more of these compounds.

As the aforesaid polyether diol can be cited alkylene oxide adducts of dihydroxyl compound such as the aforesaid low molecular weight diols and dihydric phenols.

Among the dihydric phenols are bisphenols, e.g., bisphenol A bisphenol F and bisphenol S, and monocyclic phenols e.g., catechol and hydroquinone.

Suitable alkylene oxides include ones containing 2–8 carbon atoms, for example, ethylene oxide (hereafter, referred to as "EO"), propylene oxide (hereafter, referred to as "PO"), 1,2-butylene oxide, 1,3-butylene oxide, 1,4-butylene oxide, 2,3-butylene oxide, styrene oxide, a-olefin oxide with 5 to 10 or more carbon atoms, epichlorohydrin, and combinations of two or more of these compounds, which may be added blockwise and/ or randomwise.

Of those polyether diols, preferable are alkylene oxide adducts of dihydric phenols, particularly EO adducts of dihydric phenols (especially bisphenol A).

Of those high molecular weight diols (a2), preferable are polyester diols, and more preferable polycondensates between a low molecular weight diol and a dicarboxylic acid, in view of providing excellent soft touch.

(a2) generally has an Mn of 500 to 10,000, preferably 800 to 5,000, more preferably 1,000 to 3,000. Soft touch is not obtained in case of Mn lower than 500, while the required strength is not attained when it is higher than 10,000.

Mn used herein can be calculated on the basis of a calibration curve obtained from a molecular weight standard sample such as polystyrene using gel permeation chromatography (GPC).

It is possible to use the compounds cited as starting materials for the aforesaid polyester diols as the low molecular weight diol (a3) in combination with (a2) as necessary. Suitable as (a3) are aliphatic diols, among which preferred are alkylene glycols having 2–4 carbon atoms, particularly 1,4-butane diol. (a2) and (a3) are used in a weight ratio of (a3)/(a2) usually from 0 to 0.1, preferably from 0 to 0.05. Mn of total of (a2) and (a3) is usually 500–1,500, preferably 700–1,000.

The molar ratio of the respective constituent parts making up the NCO-terminated urethane prepolymer (a) before producing the elastomer (A) to 1 mole of (a1) is this: (a2) generally 0.1 to 0.5 mole, and preferably 0.2 to 0.4 mole; (a3) generally 0 to 0.2 mole, and preferably 0.05 to 0.15 mole.

Equivalent ratio of NCO/OH is usually 1.5–2, particularly 1.7–1.9.

The content of free isocyanate group in the urethane prepolymer (a) is generally one to 10 wt %, preferably 3 to 6 wt %.

Suitable non-aromatic diamines (b1) include, for example, cycloaliphatic diamines containing 4–15 carbon atoms, such as 4,4'-diamino-3,3'-dimethyldicyclohexylmethane 1,4-diaminocyclohexane, isophoronediamine; aliphatic diamines containing 2–18 carbon atoms, such as ethylenediamine, hexamethylenediamine; araliphatic diamines containing 8–15 carbon atoms, such as xylylenediamine, a, a, a', a'-tetramethylxylylenediamine; and mixtures of two or more of these compounds. Among these compounds preferred are cycloaliphatic diamines and aliphatic diamines, particularly isophoronediamine (hereinafter referred to as IPDA) and hexamethylenediamine.

Suitable monoamine (b2) include monoalkylamines and dialkylamines, containing 1–8 carbon atoms in the alkyl group, such as methylamine, ethylamine, n- and i-propylamines, n- and i-butylamines, dimethylamine, diethylamine, di-n- and -i-propylamines, di-n- and i-butylamines and the like; mono- and di-alkanolamines, containing 2–4 carbon atoms in the hydroxyalkyl group, such as monoethanolamine, diethanolamine and the like; and mixtures of two or more of these compounds. Among these compounds, preferred are dialkylamines, particularly di-n-propylamine and di-n-butylamine.

Molar ratio of (b1)/(b2) is generally 20/1–5/1, particularly 15/1–8/1.

In the above reaction for formation of (A), an equivalent ratio of the amino group of (b1) to the isocyanate group of (a) is usually from 0.2 to 0.7, and preferably from 0.3 to 0.6, while an equivalent ratio of the amino group of (b2) to the isocyanate group of (a) is usually from 0.02 to 0.2, and preferably from 0.05 to 0.15.

Preparation methods and conditions of (a) and (A) include those disclosed in U.S. Pat. No. 5,906,704, herein incorporated by reference.

In practice of the present invention, the thermoplastic polyurethane elastomer (A) is used in powder-form. Suitable methods for producing powder of (A) are not specifically limited but include, for example, the following methods:

① method of grinding blocked or pelletized (A) through techniques, such as freeze-grinding or icing-grinding;

② method of forming a non-aqueous dispersion of (A) in an organic solvent which does not dissolve (A) (e.g. n-hexane, cyclohexane, n-heptane, etc.) and separating (A) from the non-aqueous dispersion with drying (e.g. method described in Unexamined Japanese Patent Publication No. H04-255755, etc.); and ③ method of preparing a water dispersion of (A) in water containing a dispersant and separating (A) from the water dispersion with drying (e.g. methods described in Unexamined Japanese Patent Publication Nos. H07-133423 and H08-120041).

Among them, the method of ③ is preferred in that a powder having a desired particle size can be obtained without using a large amount of the organic solvent.

Mn of (A) is generally 10,000 to 50,000, and preferably 15,000 to 30,000. If Mn is less than 10,000, no molded article having the required breaking strength can be obtained. But Mn higher than 50,000 would increase the hot-melt viscosity, affecting the moldability.

The heat-softening initiation temperature of (A) is generally from 120 to 200° C., and preferably from 130 to 150° C. When the heat-softening initiation temperature is lower than 120° C., blocking between particles of the resin is liable to occur. On the other hand, when the heat-softening initiation temperature is higher than 200° C., it becomes sometimes difficult to obtain a molded article having a smooth surface.

The term "heat-softening initiation temperature" used in the present specification can be measured in accordance with the method (TMA) described in JIS K-7196(1991).

Suitable plasticizers (B) suitable include those mentioned as examples of solbilizer in U.S. Pat. No. 3,489,723, herein incorporated by reference. Exemplary of (B) are phthalic acid esters, e.g., dibutyl phthalate, dioctyl phthalate, butyl benzyl phthalate, di-isodecyl phthalate; aliphatic dibasic acid esters, e.g., di-2-ethyl hexyl adipate, 2-ethyl hexyl sebacate; trimellitate esters, e.g., tri-2-ethyl hexyl trimellitate, tri-ocytl trimellitate; fatty acid esters, e.g., butyl oleate; benzoic esters, e.g., diethylene glycol dibenzoate, dipropylene glycol dibenzoate, aliphatic phosphates, e.g., trimethyl phosphate, triethyl phosphate, tributyl phosphate, tri-2-ethyl hexyl phosphate, tributoxy phosphate; aromatic phosphates, e.g., triphenyl phosphate, tricresyl phosphate, trixylenyl phosphate, cresyl diphenyl phosphate, xylenyl diphenyl phosphate, 2-ethyl hexyl diphenyl phosphate, tris (2,6-dimethyl phenyl)phosphate, diphenyl phosphate-hydroquinone condensate (hereinafter refered to as HQDP); halogenated aliphatic phosphates, e.g., tris(chloroethyl) phosphate, tris(β-chloropropyl)phosphate, tris(dichloropropyl)phosphate, tris(tribromoneopentyl) phosphate. Those compounds are used alone or as a mixture of two or more thereof.

Among these compounds, preferred are phthalic acid esters and phosphoric acid esters, particularly HQDP.

In the slush molding composition of the present invention, (B) is added to (A) in a quantity of generally 2 to 80 parts by weight, preferably 5 to 50 parts by weight, per 100 parts by weight of (A).

If (B) is less than 2 part by weight, the melt viscosity in molding will rise, resulting in faulty molding.

If the addition exceeds 80 parts by weight, on the other hand, (B) will bleed out on the molded skin surface with passage of time. Suitable radical polymerizable unsaturated groups contained in said compoud (C) include (meth) acryloyl (acryloyl and methacryloyl; similar expressions are used hereinafter), (meth)allyl, vinyl, propenyl and vinylidene groups, and the like.

Suitable radical polymerizable unsaturated group-containing compounds (C) include, for example, derivatives containing polymerizable unsaturated groups [including esters of an ethylenically unsaturated carboxylic acid; and ethers of an ethylenically unsaturated alcohol] of a polyhydric alcohol; esters of an ethylenically unsaturated alcohol with a polybasic acid; and mixtures of two or more of them. Suitable polyhydric alcohols constituting the above derivatives are inclusive of low molecular weight diols having a molecular weight of 62–about 500 or more as mentioned above; trihydric or higher polyhydric alcohols, having an equivalent weight of 30–about 250 or more and 3–10 or more hydroxyl groups, such as glycerol, trimethylol propane, hexane triol, trialkanol amines (e.g. triethanol amine), pentaerythritol, methyl glucoside, sorbitan, sorbitol, sucrose, polypentaerythritols (e.g. di- and tri-pentaerythritols), polyglycerols (e.g. di- to octa-glycerols) and the like; and polyether diols as mentioned above, and adducts of an alkylene oxide (containing 2–4 carbon atoms, such as EO) to a trihydric or higher polyhydric alcohol as above. Suitable ethylenically unsaturated carboxylic acids include monocarboxylic acids, such as (meth)acrylic and crotonic acids, and dicarboxylic acids, such as maleic, fumaric and itaconic acids. Suitable ethylenically unsaturated alcohols in the above ethers and esters include vinyl, (meth)allyl and propenyl alcohols. Suitable polybasic acids constituting the above esters include polycarboxylic acids, for example, dicarboxylic acids as mentioned above as the raw materials of polyester diols; polycarboxylic acids having a basicity of 3–10 or more, such as tricarballylic acid, 1,2,3-, 1,2,4- and 1,3,5-benzenetricarboxylic acids, 1,2,3,4-, 1,2,3,5- and 1,2,4,5-benzenetetracarboxylic acids, benzenepentacarboxylic acid, benzenehexacarboxylic acid, poly(meth)acrylic acid having a polymerization degree of up to 10, and the like; and other polybasic acids, such as cyanuric acid and so on.

Illustrative of derivatives of polyhydric alcohols are poly(meth)acrylates, such as ethyleneglycol di(meth)-acrylates, trimethylolpropane tri(meth)acrylates, penta-erythritol tetra(meth)acrylates, dipentaerythritol penta-(meth)acrylates; poly(meth)allyl ethers, such as penta-erythritol tri(meth) allyl ethers; polyvinyl ethers, such as ethyleneglycol divinyl ether; polypropenyl ethers, such as ethyleneglycol dipropenyl ether; polymaleates, such as ethylene dimaleate; polyitaconates, such as ethylene diitaconate, and the like. Exemplary of esters of polybasic acids are poly(meth)allyl polycarboxylates, such as di(meth)allyl phthalates, tri(meth) allyl trimellitates and the like; and tri(meth)allyl cyanurates.

Among these compounds, preferred are poly(meth) acrylates of polyhydric alcohol, polyallyl ethers of polyhydric alcohol, and polyallyl polycarboxylates, in view of radical polymerization rate. More preferred are trimethylolpropane tri(meth)acrylates, pentaerythritol tetra(meth) acrylates and dipentaerythritol penta(meth)-acrylates; among which especially preferred are these acrylates, particularly dipentaerythritol pentaacrylate (hereinafter referred to as DPPA).

The number of unsaturated groups in (C) per molecule is generally 2 to 10, preferably 3 to 6. The number of unsaturated groups less than two is not sufficient to improve the durability of the composition. On the other hand, the composition having more than 10 unsaturated groups increases too high in viscosity to be handled because it has high molecular weight.

Said (C) has an action capable of scavenging a radical, produced when the polyurethane polymer (A) is deteriorated by light (ultraviolet rays) or heat, to polymerize the compound (C) itself, thereby affording excellent long-term durability such as light and heat aging properties to the slush molded article.

The quantity of (C) to be used in the present invention per 100 parts, by weight, of polyurethane elastomer (A) is generally 0.1 to 10 parts by weight, and preferably 0.5 to 5 parts by weight. By adjusting the quantity of (C) within the above-mentioned range, a slush-molded article having an excellent durability can be obtained.

The slush molding composition of the present invention can be mixed, as necessary, with one or more stabilizers, pigments and other additives.

The stabilizers are not particularly restricted, and known antioxidants and/or ultraviolet absorbents can be used. The content of stabilizers is generally 5 parts by weight or less per 100 parts by weight of (A), preferably 3 parts by weight or less.

Among the suitable antioxidants are hindered phenols such as 2,6-di-t-butyl-p-cresol and butylhydroxyl anisole; bisphenols such as 2,2'-methylenebis(4-methyl-6-t-butylphenol); and phosphorus compounds such as triphenyl phosphite and diphenyl isodecyl phosphite.

Among the ultraviolet absorbents are benzophenones such as 2,4-dihydroxybenzophenone and 2-hydroxy-4-methoxybenzophenone; benzotriazoles such as 2-(2'-hydroxy-5'-methylphenyl)benzotriazole; salicylates such as phenyl salicylate; and hindered amines such as bis(2,2,6,6-tetramethyl-4-piperidyl)sebacate.

The pigments are not particularly restricted, and known organic pigments and/or inorganic pigments can be used. The content of pigments is generally 0.01 to 5 parts by weight per 100 parts by weight of (A).

Among the suitable organic pigments are, for example, insoluble azo pigments, soluble azo pigments, copper phthalocyanine pigments and quinacridone pigments. The inorganic pigments include, for example, chromates, ferrocyanide compounds, metal oxides, sulfide selenium compounds, metallic salts (e.g., sulfate, silicate, carbonate, phosphate), metallic powder and carbon black.

The other additives include blocking inhibitor, releasing agent, crosslinking agent, flame retarder and the like.

The following methods of preparing the slush molding composition of the present invention are given by way of example, but not limited thereto by any means.

①: A powder of (A), (B), (C) and optionally the additives are blended in a lump in a mixer.

②: (B), (C) and optionally the additives are first blended, and then mixed with a powder of (A).

③: (A) in powder is prepared in the presence of part or all of (B), (C) and optionally the additives, followed by adding the remainder to the powder mixture and mixing.

Of those methods, preferable are the methods ① and ② in that the preparing process is simplified.

Powder mixing apparatuses which are used in preparing the slush molding composition of the present invention are not restricted in particular, and known mixers can be used. Among suitable powder mixing apparatuses are high-speed shear ones, for example, fluid mixers such as a Henschel mixer (trade name), and low-speed ones such as a Nauta mixer and a planetary mixer. Preferred is a Henschel mixer.

The slush molding composition of the present invention is applied in the form of powder. The powder has an average particle diameter of generally 50 to 400 µm, preferably 100 to 300 µm, more preferably 130 to 200 µm. If powder has an average particle diameter less than 50 µm, then flowability of the powder will be poor, with the powder failing to be introduced into narrow parts of the mold, resulting in faulty molding. With powder having a diameter larger than 400 µm, on the other hand, pin holes can be caused on the molded surface skin.

Another point is that fine particles with a particle diameter of less than 100 µm is contained in the powder in an amount generally not more than 50 percent by weight, and preferably not more than 30 percent by weight. If the percentage of the particles less than 100 µm in particle diameter exceeds 50 percent by weight, dusting will be caused and the powder will not flow well into the narrow areas in the mold, resulting in faulty molding.

The repose angle of the powder is usually not more than 35°, and preferably not more than 33°, while the spatula angle is usually not more than 50°, and preferably not more than 40°. When the repose angle and spatula angle are not within the above range, the flowability of the powder becomes inferior and it becomes sometimes difficult to mold because the narrow portions of the mold are not filled with powder on slush molding.

The average particle diameter mentioned here is defined as a value of 50% pass particle diameter expressed in the sieve opening through which 50 percent by weight of the sample passes as measured by particle size distribution meter, e.g., TUBUTEC manufactured by LASENTEC LTD. The repose angle and spatula angle are defined as values measured by powder tester manufactured by HOSOKAWA MICRON LTD.

The compositions (powders) according to the invention can be used with advantage for slush molding. Slush molding may be done through any known slush molding processes, in which a homogeneous coating is obtained on preheated moldings by melting the powder and after cooling the workpiece is withdrawn again as a skin. Illstrative of slush molding techniques are those described in U.S. Pat. No. 5,077,339, herein incorporated by reference.

Molded article made of the slush molding composition of the present invention is very useful as automobile interior material, for example, for instrument panel and also applicable to other molded articles such as sofa surface skin and other interior furniture.

DESCRIPTION OF THE PREFERRED EMBODIMENTS

Now the present invention will be described in more detail by the following examples but is by no means restricted thereto. In the following description, it is understood, part or parts mean part or parts by weight and percent denotes percent by weight. The raw materials used are supplied by the following manufacturers under the following brand-name.

[Raw material//Brand-name//Manufacturer]

Polycaprolactone diol//PLACCEL L220A//DAICEL CHEMICAL INDUSTRIES, LTD.

Polyvinyl alcohol//PVA-235//KURARAY CO.,LTD.

Blocking inhibitor (finely powdered silica)//SILYSIA 978//FUJI SILYSIA CHEMICAL INDUSTRIES, LTD.

Dipentaerythritol pentacrylate//NEOMER DA-600// SANYO CHEMICAL INDUSTRIES, LTD.

Light stabilizer//DIC-TBS//DAINIPPON INK AND CHEMICALS, INC.

Hydroquinone condensation product of diphenyl phosphate//CR733S//DAIHACHI CHEMICAL IND. CO., LTD.

Titanium oxide//TIPAQUE R-820//ISHIHARA SANGYO KAISHA, LTD.

Trimethylolpropane triacrylate//NEOMER TA-300// SANYO CHEMICAL INDUSTRIES, LTD.

Pentaerythritol triallyl ether//P-30//DAISO CO.,LTD.

PREPARATION EXAMPLE 1

820 parts of polycaprolactone diol with Mn of 2,000 and a hydroxyl value of 56 was placed in a four-necked flask equipped with a stirrer and a thermometer and dehydrated under heating for one hour at 110° C. under a vacuum pressure of 3 mmHg. Then 120 parts of IPDI was added and the mixture was allowed to react for 10 hours at 110° C. to give an NCO-terminated urethane prepolymer containing 3.4 percent of free isocyanate group.

230 parts of said urethane prepolymer was placed in a beaker, followed by adding thereto 750 parts of a dispersion medium comprising water and 3 parts of polyvinyl alcohol dissolved therein. The resulting mixture was then stirred for one minute with an ultra disperser (manufactured by YAMATO SCIENTIFIC LTD.) at 9,000 rpm.

The mixture was transferred into a four-necked flask mounted with a stirrer and a thermometer, and 15 parts of IPDA and 1.5 parts of diethanolamine were added thereto under stirring and allowed to react for 10 hours at 50° C. The reaction product was then filtered and dried to obtain a powdery urethane elastomer having Mn of 40,000 (by GPC), average particle diameter of 135 µm and heat softening initiation temperature of 145° C. The elastomer was mixed with one part of blocking inhibitor and 0.5 part of light stabilizer to prepare an urethane elastomer powder.

PREPARATION EXAMPLE 2

340 parts of polyhexamethyleneisophthalate diol with Mn of 1,000 and a hydroxyl value of 112 was placed in a four-necked flask equipped with a stirrer and a thermometer and dehydrated under heating for one hour at 110° C. under a vacuum pressure of 3 mmHg. Then 190 parts of hydrogenated MDI was added and the mixture was allowed to react for 5 hours at 110° C. to give an NCO-terminated urethane prepolymer containing 5.1 percent of free isocyanate group.

510 parts of said urethane prepolymer was placed in a beaker, followed by adding thereto 1,500 parts of a dispersion medium comprising water and 3 parts of polyacrylic acid dispersant ("CARIBON B" manufactured by SANYO CHEMICAL INDUSTRIES, LTD.) dissolved therein. The resulting mixture was then stirred for one minute with an ultra disperser (manufactured by YAMATO SCIENTIFIC LTD.) at 9,000 rpm.

The mixture was transferred into a four-necked flask mounted with a stirrer and a thermometer, and 50 parts of IPDA and 1 part of dibutylamine were added thereto under stirring and allowed to react for 10 hours at 50° C. The reaction product was then filtered and dried to obtain a powdery urethane elastomer having Mn of 48,000 (by GPC), average particle diameter of 135 μm and heat softening initiation temperature of 145° C. The elastomer was mixed with one part of blocking inhibitor and 0.5 part of light stabilizer to prepare an urethane elastomer powder.

Example 1

100 parts of the urethane elastomer powder obtained in Preparation Example 1,3 parts of DPPA as constituent (C), 10 parts of HQDP as constituent (B) and 1 part of titanium oxide as additive were placed in a Henschel mixer and mixed for one minute at 200 rpm. After that, the mixture was allowed to mature for one hour at 100° C. and then to cool to 40° C. Then 1 part of blocking inhibitor was added to obtain a slush molding composition (Si) of the present invention. The average particle diameter, measured by particle size distribution meter TUBTEC manufactured by LASENTEC LTD. (similarly hereinafter), of (Si) was 177 μm, and the content of particles less than 100 μm in diameter was 12%.

Example 2

Another slush molding composition (S2) of the present invention was obtained in the same procedure as in Example 1, except substituting trimethylolpropane triacrylate for DPPA. The average particle diameter of (S2) was 185 μm, and the content of particles less than 100 Mm in diameter was 5%.

Example 3

Still another slush molding composition (S3) of the present invention was obtained in the same procedure as in Example 1, except substituting pentaerythritol triallyl ether for DPPA. The average particle diameter of (S3) was 182 μm, and the content of particles less than 100 μm in diameter was 8%.

Example 4

A further slush molding composition (S4) of the present invention was obtained in the same procedure as in Example 1, except substituting 5 parts of ethyleneglycol dimethacrylate for 3 parts of DPPA. The average particle diameter of (S4) was 165 μm, and the content of particles less than 100 μm in diameter was 16%.

Example 5

100 parts of the urethane elastomer powder obtained in Preparation Example 2, 3 parts of DPPA as constituent (C), 25 parts of HQDP as constituent (B) and 1 part of titanium oxide as additive were placed in a Henschel mixer and mixed for one minute at 200 rpm. After that, the mixture was allowed to mature for one hour at 100° C. and then to cool to 40° C. Then 1 part of blocking inhibitor was added to obtain a slush molding composition (S5) of the present invention. The average particle diameter of (S5) was 150 μm, and the content of particles less than 100 μm in diameter was 8%.

Comparative Example 1

A slush molding composition (S6) for comparison was obtained in the same procedure as in Example 1, without using any DPPA. The average particle diameter of (S6) was 173 μm, and the content of particles less than 100 μm in diameter was 12%.

Testing 1

The compositions (S1), (S2), (S3), (S4), (S5) and (S6) obtained in Examples 1 to 5 and Comparative example 1 were tested. Each sample was brought for 10 seconds into contact with a mold heated to 220° C. After hot melting, the unmelted powder was removed out of the melt, which was then left standing for one minute at room temperature and cooled in water to give a molded sheet. The molded sheets thus obtained were put to the following tests to examine the properties. The test results are summarized in Table 1.

Breaking strength and elongation (25° C.), low-temperature breaking strength (−35° C.), hardness: ASTM-D638

Appearance: The presence or absence of uneven color of the molded sheet surface was visually evaluated based on the following standard.

◯; uniform, Δ; faint unevenness, X; unevenness

TABLE 1

| | Ex. 1 | Ex. 2 | Ex. 3 | Ex. 4 | Ex. 5 | Comp. ex. 1 |
|---|---|---|---|---|---|---|
| Composition | S1 | S2 | S3 | S4 | S5 | S6 |
| Elongation, % | 360 | 330 | 380 | 370 | 370 | 320 |
| Breaking strength, MPa | 12 | 11 | 13 | 14 | 16 | 13 |
| Low-temp. Elongation, % | 250 | 275 | 270 | 290 | 280 | 280 |
| Low-temp. Breaking strength, MPa | 20 | 18 | 17 | 20 | 20 | 17 |
| Hardness, Shore A | 75 | 73 | 75 | 73 | 73 | 73 |
| Appearance | ○ | ○ | ○ | ○ | ○ | ○ |

Table 1 shows that the compositions of Examples are nearly equal to the comparative example in the properties at the beginning.

Testing 2

Molded sheets were prepared from (S1) to (S6) within the mold in accordance with Testing 1, followed by introducing thereinto urethane foam-forming components of the following formulation to obtain urethane foams with the surface layer of each molded sheet of (S1) to (S6).

Formulation: 95 parts of an EO-chipped polyoxypropylene triol having Mn of 5,000, 5 parts of triethanolamine, 2.5 parts of water, 1 part of triethylamine and 61.5 parts of a polymeric MDI.

Those moldings were heat treated in a circulating-air drier for 500 hours at 120° C. Then the urethane foams were removed from the respective molded sheets, which were then put to the following tests of physical properties. The test results are shown in Table 2.

Elongation (25° C., −35° C.): ASTM-D638

Appearance: Visual evaluation based on the following standard

◯; No change is observed.

X; A change is observed.

TABLE 2

|  | Ex. 1 | Ex. 2 | Ex. 3 | Ex. 4 | Ex. 5 | Comp. ex. 1 |
|---|---|---|---|---|---|---|
| Composition | S1 | S2 | S3 | S4 | S5 | S6 |
| Elongation, after heating (25° C.) | 300 | 370 | 360 | 350 | 340 | 110 |
| Elongation, after heating (−35° C.) | 110 | 98 | 220 | 210 | 200 | 60 |
| Appearance | ○ | ○ | ○ | ○ | ○ | X |

Testing 3

The urethane foams with each surface layer of (S1) to (S6) obtained in Testing 2 were tested in a carbon arc fadeometer for 400 hours at a black panel temperature of 83° C., Then the urethane foams were removed from the respective molded sheets, which were then put to the following tests of physical properties. The test results are shown in Table 3.

Elongation (25° C., −35° C.): ASTM-D638

Appearance: Visual evaluation based on the following standard

○; No change is observed.

X; A change is observed.

TABLE 3

|  | Ex. 1 | Ex. 2 | Ex. 3 | Ex. 4 | Ex. 5 | Comp. ex. 1 |
|---|---|---|---|---|---|---|
| Composition | S1 | S2 | S3 | S4 | S5 | S6 |
| Elongation subjected to fademeter (25° C.) | 260 | 270 | 300 | 280 | 270 | 10 |
| Elongation, subjected to fademeter (−35° C.) | 135 | 140 | 120 | 180 | 170 | 0 |
| Appearance | ○ | ○ | ○ | ○ | ○ | X |

As shown in Tables 2 and 3, the molded sheets from the compositions of the present invention is large in elongation as compared with the comparative one. It is clear, therefore, that the invention compositions are excellent in thermal aging resistance and light aging resistance.

What is claimed as new and desired to be secured by Letters Patent is:

1. A molded article, obtained by slush-molding a composition comprising:
    a thermoplastic polyurethane elastomer (A) having a number average molecular weight of 10,000 to 50,000 and a heat softening initiation temperature of 120 to 200° C.;
    a plasticizer (B); and
    a compound (C) containing at least two radical polymerizable unsaturated groups;
    with or without an additive.

2. The molded article of claim 1, wherein at least one of said radical polymerizable unsaturated groups of (C) is at least one selected from the group consisting of acryloyl, methacryloyl, allyl, methallyl, vinyl, propenyl and vinylidene groups.

3. The molded article of claim 1, wherein (C) has from three to six radical polymerizable unsaturated groups.

4. A molded article, obtained by slush-molding a composition comprising:
    a thermoplastic polyurethane elastomer (A) having a number average molecular weight of 10,000 to 50,000 and a heat softening initiation temperature of 120 to 200° C.;
    a plasticizer (B); and
    a compound (C) containing at least one radical polymerizable unsaturated group;
    with or without an additive;
    wherein (C) is at least one selected from the group consisting of ethylenically unsaturated carboxylic acid esters of a polyhydric alcohol, ethylenically unsaturated ethers of a polyhydric alcohol, and ethylenically unsaturated alcohol esters of a polybasic acid.

5. The molded article of claim 1, wherein (C) is at least one selected from the group consisting of polyacrylates of a polyhydric alcohol, polymethacrylates of a polyhydric alcohol, polyallyl ethers of a polyhydric alcohol and polyallyl polycarboxylates.

6. The molded article of claim 1, wherein (C) is at least one selected from the group consisting of ethyleneglycol di(meth)acrylates, trimethylolpropane tri(meth)acrylates, pentaerythritol tetra(meth)acryvlates, dipentaerythritol penta(meth)acrylates, pentaerythritol tri(meth)allyl ethers, ethyleneglycol divinyl ether, ethyleneglycol dipropenyl ether, ethylene dimaleate, ethylene diitaconate, di(meth)allyl phthalates, tri(meth)allyl trimellitates and tri(meth)allyl cyanurates.

7. The molded article of claim 1, wherein said elastomer (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a high-molecular diol (a2) having a number average molecular weight of 500 to 10,000, with or without a low-molecular diol (a3).

8. The molded article of claim 7, wherein (a2) is at least one selected from the group consisting of polyester diols and polyether diols.

9. The molded article of claim 7, wherein (a2) is at least one polyester diol, selected from the group consisting of polycondensates of a dicarboxylic acid with a low molecular weight diol and ring-opening polymerizates of a lactone with a low molecular weight diol.

10. The molded article of claim 7, wherein (b1) is at least one selected from alicyclic diamines and aliphatic diamines.

11. The molded article of claim 7, wherein (b2) is at least one selected from the group consisting of monoalkylamines, dialkylamines, monoalkanol amines and dialkanol amines.

12. The molded article of claim 1, wherein the composition contains from 0.1 to 10 parts by weight of (C) and from 2 to 80 parts by weight of (B), per 100 parts by weight of (A).

13. The molded article of claim 1, wherein the composition is in the form of a powder having an average particle diameter of 50 to 400 μm and containing not more than 50% by weight of fine particles less than 100 μm.

14. A process for producing a molded article, which comprises slush-molding a composition comprising:
    a thermoplastic polyurethane elastomer (A) having a number average molecular weight of 10,000 to 50,000 and a heat softening initiation temperature of 120 to 200° C.;
    a plasticizer (B); and
    a compound (C) containing at least two radical polymerizable unsaturated groups;

with or without an additive.

15. The process of claim 14, wherein (C) has from three to six radical polymerizable unsaturated groups, at least one of said radical polymerizable unsaturated groups being at least one selected from the group consisting of acryloyl, methacryloyl, allyl, methallyl, vinyl, propenyl, and vinylidene groups.

16. The process of claim 14, wherein (C) is at least one selected from the group consisting of ethylenically unsaturated carboxylic acid esters of a polyhydric alcohol, ethylenically unsaturated ethers of a polyhydric alcohol, and ethylenically unsaturated alcohol esters of a polybasic acid.

17. The process of claim 14, wherein said elastomer (A) is obtained by reacting an NCO-terminated urethane prepolymer (a) with a non-aromatic diamine (b1) and an aliphatic monoamine (b2); said urethane prepolymer (a) having been derived from an excess non-aromatic diisocyanate (a1) and a high-molecular diol (a2) having a number average molecular weight of 500 to 10,000, with or without a low-molecular diol (a3).

18. The process of claim 14, wherein the composition contains from 0.1 to 10 parts by weight of (C) and from 2 to 80 parts by weight of (B), per 100 parts by weight of (A).

19. The process of claim 14, wherein the composition is in the form of a powder having an average particle diameter of 50 to 400 μm and containing not more than 50% by weight of fine particles less than 100 μm.

20. A slush-molding composition comprising:
   a thermoplastic polyurethane elastomer (A) having a number average molecular weight of 10,000 to 50,000 and a heat softening initiation temperature of 120 to 200° C.;
   a plasticizer (B); and
   a compound (C) containing at least two radical polymerizable unsaturated groups;
   with or without an additive;
   wherein the composition contains from 0.1 to 10 parts by weight of (C) and from 2 to 80 parts by weight of (B), per 100 parts by weight of (A).

21. A process for producing a molded article, which comprises slush-molding a composition comprising:
   a thermoplastic polyurethane elastomer (A) having a number average molecular weight of 10,000 to 50,000 and a heat softening initiation temperature of 120 to 200° C.;
   a plasticizer (B); and
   a compound (C) containing at least one radical polymerizable unsaturated group;
   with or without an additive;
   wherein said radical polymerizable unsaturated group is at least one selected from the group consisting of acryloyl group, methacryloyl group, allyl group present in an allyl ester or ether and methallyl group present in a methallyl ester or ether.

22. The process of claim 21, wherein said radical polymerizable unsaturated group is at least one selected from the group consisting of acryloyl and methacryloyl groups.

23. A molded article, obtained by the process of claim 21.

24. A molded article, obtained by the process of claim 22.

* * * * *